United States Patent
Mittler et al.

(10) Patent No.: US 6,448,532 B1
(45) Date of Patent: Sep. 10, 2002

(54) METHOD FOR RESISTANCE WELDING METAL PARTS

(75) Inventors: Bodo Mittler, Neusaess; Joachim Mack, Munich, both of (DE)

(73) Assignee: Patent-Treuhand-Gesellschaft für elektrische Glühlampen mbG, Munich (DE)

( * ) Notice: Subject to any disclaimer, the term of this patent is extended or adjusted under 35 U.S.C. 154(b) by 0 days.

(21) Appl. No.: 09/762,801

(22) PCT Filed: Jun. 29, 2000

(86) PCT No.: PCT/DE00/02038

§ 371 (c)(1),
(2), (4) Date: Feb. 13, 2001

(87) PCT Pub. No.: WO01/02127

PCT Pub. Date: Jan. 11, 2001

(30) Foreign Application Priority Data

Jul. 2, 1999 (DE) .......................... 199 30 336

(51) Int. Cl.⁷ .............................................. B23K 11/06
(52) U.S. Cl. ............................ 219/83; 219/58; 219/84; 219/117.1
(58) Field of Search ................. 219/61.12, 56, 219/58, 81, 82, 83, 84, 91.2, 117.1

(56) References Cited

U.S. PATENT DOCUMENTS

| | | | | |
|---|---|---|---|---|
| 3,597,571 A | * | 8/1971 | McGill |
| 3,715,558 A | * | 2/1973 | McGill |
| 3,784,081 A | * | 1/1974 | Karmann et al. |
| 3,798,405 A | * | 3/1974 | Boothe |
| 3,944,782 A | * | 3/1976 | Metcalfe et al. |
| 4,079,223 A | * | 3/1978 | Lee et al. |
| 4,160,892 A | * | 7/1979 | Opprecht et al. |
| 4,780,589 A | | 10/1988 | Davies |
| 4,879,445 A | * | 11/1989 | Kawano et al. |
| 5,017,749 A | * | 5/1991 | Boyd et al. |
| 5,131,581 A | * | 7/1992 | Geiermann |
| 5,726,410 A | * | 3/1998 | Fukushima et al. |
| 5,874,875 A | | 2/1999 | Kobayashi et al. |
| RE36,612 E | * | 3/2000 | Fukushima et al. |
| 6,268,581 B1 | * | 7/2001 | Nakamura et al. |

FOREIGN PATENT DOCUMENTS

| AT | 326 980 | 1/1976 |
|---|---|---|
| GB | 2 177 336 | 1/1987 |

* cited by examiner

Primary Examiner—M. Alexandra Elve
Assistant Examiner—Kiley Stoner
(74) Attorney, Agent, or Firm—Frishauf, Holtz, Goodman & Chick, P.C.

(57) ABSTRACT

The invention relates to a resistance welding process for welding metal parts together. To improve the quality of the weld, at least one welding electrode (4) is embodied as a circular cylinder, which is seated so that it rotates around its cylinder axis. In accordance with the invention, the welding electrode (4) in the shape of a circular cylinder is caused to rotate at least during the welding of the metal parts (1, 2), so that by means of creating a sliding friction between the surface area of the welding electrode (4) and the surface of the metal part (2) resting against it the surface of the latter is freed of possible impurities. The process is particularly well suited for welding sand-blasted molybdenum foils and tungsten wires together.

6 Claims, 1 Drawing Sheet

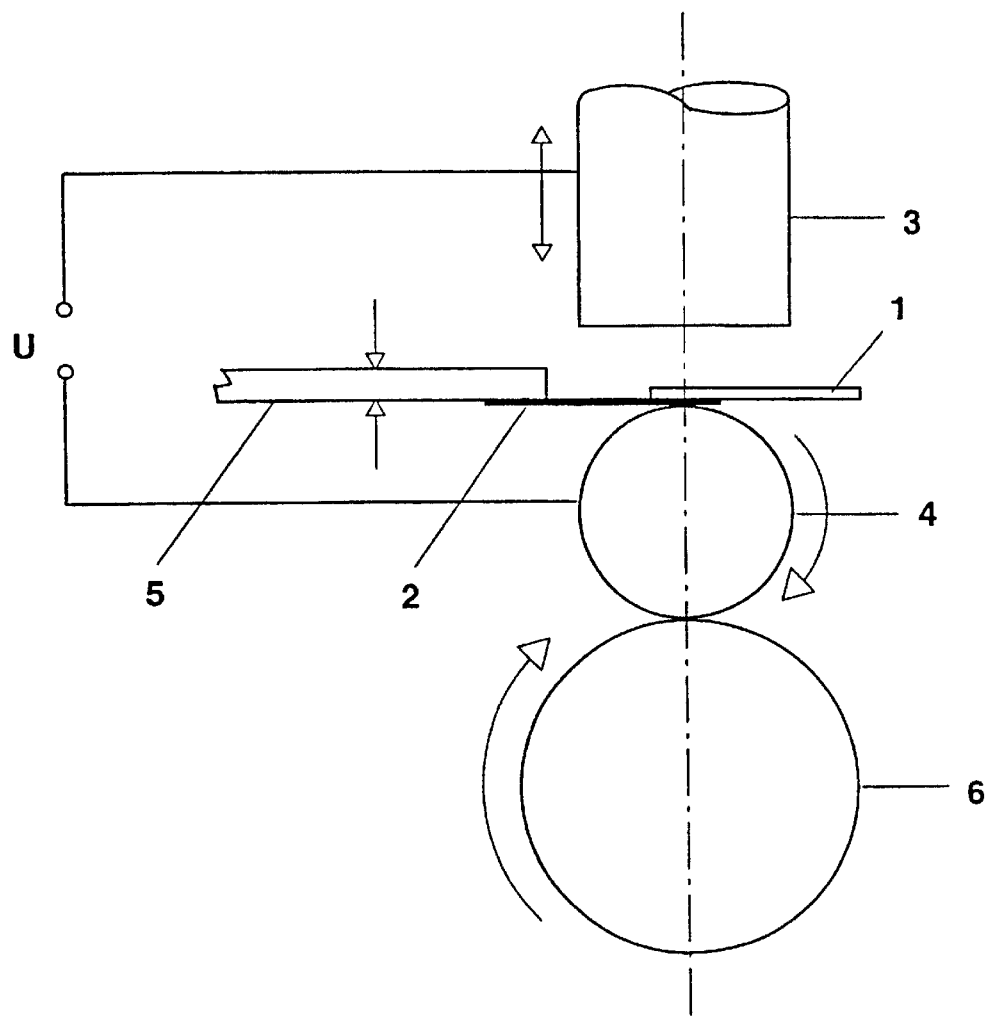

METHOD FOR RESISTANCE WELDING METAL PARTS

The invention relates to a process for resistance welding of metal parts in accordance with the preamble of claim 1.

1. Technical Field

The invention in particular relates to a resistance welding process for welding together metal parts, at least one of which has a soiled or roughened surface.

For resistance welding, the metal parts to be welded together customarily are arranged overlapping each other and clamped between two welding electrodes. In the course of the welding process, one of the welding electrodes is trackingly guided in accordance with the deformation of the welded parts in order to assure the clamped seating. An electrical voltage is applied to the welding electrodes for welding the metal parts together, so that an electrical current flows through the welding electrodes and through the metal parts. Because of the relatively high contact resistance between the metal parts to be welded, the areas of the metal parts through which current flows are strongly heated by the current flow and are welded together. This type of resistance welding, which is usually employed, results in an insufficient welding quality when welding metal parts with soiled or roughened surfaces together.

2. Representation of the Invention

It is the object of the invention to make available a process for resistance welding of metal parts, which results in a satisfactory welding quality even in connection with the welding of metal parts with soiled or roughened surfaces.

In accordance with the invention, this object is attained by means of the characterizing features of claim 1. Particularly advantageous embodiments of the invention are described in the dependent claims.

To perform the resistance welding process in accordance with the invention, the metal parts to be welded together are arranged overlapping each other between a first and a second welding electrode. The metal parts to be welded together are moreover clampingly fixed in place between the welding electrodes. In accordance with the invention, at least one of the two welding electrodes is embodied as a circular cylinder, which is seated so it rotates around its cylinder axis, and rests with its surface area against one of the metal parts. A sliding friction is generated, at least during the time in which the welding electrodes and the metal parts are charged with the welding current, between the surface area of the circular cylinder and the metal part on which it rests by rotating the at least one welding electrode embodied as a circular cylinder. The surface of the metal part resting against the circular cylinder and facing the surface area is cleaned and/or smoothed in the area of the weld during the actual welding process by the friction, and the electrical contact between the at least one welding electrode embodied as a circular cylinder, and the metal part resting against it is improved by this. Furthermore, the rotation in accordance with the invention of the at least one welding electrode embodied as a circular cylinder prevents the occurrence of the so-called adhesive effect between the welding electrode and the metal part to be welded. The term adhesive effect describes an adhesion of a welding electrode to the metal part with which it is in contact during the welding process. The adhesion of the welding electrodes and the metal part is severed again by pulling the welding electrodes apart following the termination of the welding process. However, this can lead to damage to the welding electrode or the welded connection.

Advantageously at least one welding electrode embodied as a circular cylinder is already caused to rotate prior to the actual welding process. Moreover, the rubbed-off material caused by the sliding friction and adhering to the surface area of the at least one welding electrode embodied as a circular cylinder is cleaned off, preferably with the aid of a cleaning device. The cleaning process advantageously already takes place during the welding process in order to assure a uniform welding quality. Possible damages to the surface of the welding electrodes, which had been caused by the transition of the welding current in the area of the weld, are removed by the cleaning process.

The resistance welding process in accordance with the invention can be applied particularly advantageously for welding together foil-like or sheet-like metal parts with soiled or roughened surfaces and wire-like or rod-like metal parts.

DESCRIPTION OF THE PREFERRED EXEMPLARY EMBODIMENT

The invention will be explained in greater detail in what follows by means of a preferred exemplary embodiment. The drawing FIGURE schematically shows the structure of a resistance welding device, by means of which the process in accordance with the invention is described, using the example of welding a tungsten wire together with a sand-blasted molybdenum foil. The tungsten wire and the molybdenum foil are intended to be melted in a gas-proof manner into the glass vessel of an electrical lamp. They constitute an electrical current supply device for the illuminant arranged in the glass vessel.

For welding, the tungsten wire 1 and the molybdenum foil 2, which was sand-blasted with corundum, are positioned in an overlapping manner in a holder 5 between two welding electrodes 3, 4. The two welding electrodes 3, 4 are made of tungsten. The first, upper welding electrode 3 is embodied to be rod-shaped, while the second, lower welding electrode 4 is embodied as a circular cylinder, which is seated so it can rotate around its cylinder axis. The metal parts 1, 2 to be welded together are arranged in such a way that the underside of the molybdenum foil 2 rests on the surface area of the lower welding electrode embodied as a rotatably seated circular cylinder 4, and the tungsten wire 1 rests on the top of the molybdenum foil 2. Subsequently the upper, rod-shaped welding electrode 3 is lowered onto the tungsten rod 1, so that the tungsten rod 1 and the molybdenum foil 2 are clampingly fixed between both welding electrodes 3, 4. The lower welding electrode 4 is caused to rotate, so that sliding friction occurs between the surface area of the circular cylinder 4 and the underside of the molybdenum foil 2. By means of this, the underside of the sand-blasted molybdenum foil 2 is freed of sand-blasting particles, in this case corundum particles, adhering to it in the area of the weld. Rubbed-off particles, which could possibly adhere to the surface area of the lower welding electrode 4, are removed with the aid of a grinding disk 6, which rotates in the opposite direction to the welding electrode 4. The electrical contact between the molybdenum foil 2 and the lower welding electrode 4 is improved by the removal of the corundum particles from the area of the weld. Thereafter, an electrical voltage U is applied to the welding electrodes 3, 4, so that an electrical current of sufficiently high current strength flows through the welding electrodes 3, 4 and through the tungsten wire 1, as well as through the molybdenum foil 2 in the area of the weld, which leads to the molybdenum foil 2 and the tungsten wire 1 being welded together. During the welding process, i.e. while the welding current flows, the lower welding electrode 4 rotates at a number of revolutions of approximately three revolutions per minute. A force of approximately five Newtons is exerted on the metal parts 1, 2 by the clamped seating of the metal parts 1, 2 between the welding electrodes 3, 4.

The invention is not limited to the exemplary embodiment described in greater detail above. It is for example also possible for both welding electrodes to be embodied as circular cylinders, which are seated, rotatable around their cylinder axis, so that the contact surfaces of both metal parts can be treated by means of the appropriate welding electrode. Other arbitrary metal parts, instead of molybdenum foils and tungsten wires, can be welded together with the aid of the process in accordance with the invention. The numerical values mentioned above for the number of revolutions of the lower welding electrode and the pressure of the welding electrodes on the metal parts should be understood to be only examples. The number of revolutions can lie between 3 to 130 revolutions per minute, and the force exerted by the welding electrodes on the metal parts can lie between 1 to 40 N. Cleaning of the welding electrode by means of the grinding disk can be performed at any time.

What is claimed is:

1. A process for resistance welding of metal parts, comprising:

overlapping the metal parts (1, 2) to be welded together between a first (3) and a second (4) welding electrode during the welding process, clampingly fixing the metal parts (1, 2) to be welded together in place between the welding electrodes (3, 4), charging the welding electrodes (3, 4) and the metal parts (1, 2) to be welded together for a period time with an electrical current for welding, characterized in that at least one of the welding electrodes (4) is a circular cylinder, which is seated to be rotatable around its cylinder axis and whose surface area rests against one of the metal parts (2), at least during the period of time in which the welding electrodes (3, 4) and the metal parts to be welded (1, 2) are charged with the electrical current, rotating the circular cylinder (4) around its cylinder axis, so that a sliding friction is generated between the surface area of the circular cylinder (4) and the metal part (2) resting against it.

2. The process in accordance with claim 1, characterized in that the circular cylinder (4) is already rotating around its cylinder axis prior to the welding electrodes (3, 4) and the metal parts (1, 2) to be welded together being charged with electrical current.

3. The process in accordance with claim 1, characterized in that the surface area of the circular cylinder (4) is cleaned by means of a cleaning device (6).

4. The process in accordance with claim 1, characterized in that the metal parts (1, 2) to be welded together are a rod-shaped or wire-shaped first metal part (1) and a foil-like shaped or sheet-shaped second metal part (2).

5. The process in accordance with claim 1, characterized in that at least one of the metal parts (2) has at least one soiled or roughened surface, and the surface area of the circular cylinder (4) rests against the at least one soiled or roughened surface.

6. The process in accordance with claim 1, characterized in that the metal parts to be welded together are roughened molybdenum foils (2) and tungsten wires (1).

* * * * *